US009978131B2

United States Patent
Cheng et al.

(10) Patent No.: US 9,978,131 B2
(45) Date of Patent: May 22, 2018

(54) VIDEO IMAGE DENOISING AND ENHANCING METHOD AND DEVICE BASED ON RANDOM SPRAY RETINEX

(71) Applicant: China University of Mining and Technology, Xuzhou (CN)

(72) Inventors: Deqiang Cheng, Xuzhou (CN); Hai Liu, Xuzhou (CN); Leida Li, Xuzhou (CN); Guopeng Zhang, Xuzhou (CN); Xingge Guo, Xuzhou (CN)

(73) Assignee: China University of Mining and Technology, Xuzhou (CN)

( * ) Notice: Subject to any disclaimer, the term of this patent is extended or adjusted under 35 U.S.C. 154(b) by 0 days. days.

(21) Appl. No.: 15/305,350

(22) PCT Filed: Nov. 9, 2015

(86) PCT No.: PCT/CN2015/094088
§ 371 (c)(1),
(2) Date: Oct. 20, 2016

(87) PCT Pub. No.: WO2016/169244
PCT Pub. Date: Oct. 27, 2016

(65) Prior Publication Data
US 2018/0053287 A1 Feb. 22, 2018

(30) Foreign Application Priority Data

Apr. 20, 2015 (CN) .......................... 2015 1 0187842

(51) Int. Cl.
*G06K 9/00* (2006.01)
*G06K 9/40* (2006.01)
(Continued)

(52) U.S. Cl.
CPC ................ *G06T 5/008* (2013.01); *G06T 5/20* (2013.01); *G06T 2207/10016* (2013.01);
(Continued)

(58) Field of Classification Search
USPC .................................................. 382/167, 274
See application file for complete search history.

(56) References Cited

FOREIGN PATENT DOCUMENTS

| CN | 104346776 A | 2/2005 |
| CN | 101303756 A | 11/2008 |

(Continued)

OTHER PUBLICATIONS

Banic et al, "Light Random Sprays Retinex:Exploiting the noisy Illumination Estimation", IEEE, 2013, vol. 20, pp. 1240-1243.*

(Continued)

*Primary Examiner* — Kathleen Y Dulaney
(74) *Attorney, Agent, or Firm* — Gokalp Bayramoglu

(57) ABSTRACT

The invention relates to image processing technology field, and discloses a video image denoising and enhancing method based on random spray retinex, including: structuring spray pixel sets, and tuning parameters related to the random spray retinex based on the spray pixel sets, wherein the parameters include quantity of the spray pixel sets and quantity of pixels; processing video images with random spray retinex based on tuned parameters; denoising the video images processed by the random spray retinex via low pass filters and blur channels to get a brightness variation calculating formula; obtaining a brightness calculating formula of output images, combined with the brightness variation calculating formula, and calculating brightness variations of three channels via the brightness calculating formula to get local brightness estimating vectors; and fusing the three channels based on the local brightness estimating vectors to get denoised and enhanced video images.

6 Claims, 4 Drawing Sheets

(51) Int. Cl.
*G06T 5/00* (2006.01)
*G06T 5/20* (2006.01)

(52) U.S. Cl.
CPC ............... *G06T 2207/10024* (2013.01); *G06T 2207/20182* (2013.01); *G06T 2207/20201* (2013.01); *G06T 2207/20208* (2013.01)

(56) References Cited

FOREIGN PATENT DOCUMENTS

| | | |
|---|---|---|
| CN | 102682436 A | 9/2012 |
| CN | 103295205 A | 9/2013 |
| CN | 104796582 A | 7/2015 |
| JP | 2005182232 A | 7/2007 |
| KR | 20100027888 A | 3/2010 |
| KR | 101360411 B1 | 2/2014 |

OTHER PUBLICATIONS

Wang et al, "Measuring Driving Behaviors from Live Video", IEEE 2012, vol. 27, issue 4, pp. 75-80.*

Jothi et al "Random Spray Retinex based Colour Constancy for Perceptual Grouped HDR Images" IEEE 2010, pp. 1-5.*

* cited by examiner (a)

(b)

VIDEO IMAGE DENOISING AND ENHANCING METHOD AND DEVICE BASED ON RANDOM SPRAY RETINEX

TECHNICAL FIELD

The invention relates to the image processing technology field, and particularly relates to a video image denoising and enhancing method and device based on random spray retinex.

BACKGROUND

In recent years, the multimedia technology has matured a lot and the video devices are widely used everywhere, such as monitoring and military affairs, etc. Furthermore, the requirements for video quality are also increasing. However, the video quality is poor due to some inevitable objective factors, and thus fails to meet the demand. Hence, the research on how to enhance and denoise the video images in real time is very significant.

The poor quality of the video images is caused by the following two aspects: (1) Video capturing systems generally can capture images with better quality in a fine day. However, in a bad weather with thick fog or dust, etc., or during the night without enough light, the contrast of images captured by the system is always low, and nothing of value can be obtained from the images. With the video image enhancing technology, the visual effect of the video images can be effectively improved to highlight the interesting information and discard the useless information. (2) The poor quality of images and deviation from the real situation are caused by the noises in the process of image capturing and transmission, greatly decreasing the accuracy of the extracted information. Therefore, it is essential to eliminate the noises before utilizing the video images, to improve the denoised images and highlight the video image characters.

The gray image enhancing methods are more mature, including contrast enhancing method, histogram equalization method, homomorphic filtering method, wavelet transforming method, etc. The color image enhancing method, such as the retines algorithm based on the path comparison, is mainly based on retinex theory, which is good for dynamic range compression and color constancy. However, the algorithm has a complex calculation, high dependency on the geometric paths and sample noises, and is also ineffective for the images with noises. Therefore, the algorithm based on the retinex theory needs to be improved.

SUMMARY OF THE INVENTION

The objectives of this invention are to provide a video image denoising and enhancing method and device based on random spray retinex, to solve the problems of the halo based on a certain direction and unsatisfactory denoising effects.

To achieve the objectives, the technical solution of the invention provides a video image denoising and enhancing method based on random spray retinex including: structuring spray pixel sets, and tuning the parameters related to the random spray retinex based on the spray pixel sets, wherein the parameters include the quantity of the spray pixel sets and the quantity of the pixels; processing the video images with random spray retinex based on the tuned parameters; denoising the video images processed by the random spray retinex via low pass filters and blur channels to get the brightness variation calculating formula; obtaining the brightness calculating formula of the output images, combined with the brightness variation calculating formula, and calculating the brightness variations of the three channels via the brightness calculating formula to get the local brightness estimating vectors; fusing the three channels based on the local brightness estimating vectors to get the denoised and enhanced video images.

Preferably, the spray pixel sets are structured by the polar coordinates,. specifically including:

The n pixels centered at the pixel i are represented by $Spray_k(i)$, wherein the coordinate of the pixel i is $(i_x, i_y)$, and the coordinate of the pixel j, belonging to the spray pixel set $Spray_k(i)$ is $(j_x, j_y)$, then the polar coordinate is:

$$\begin{cases} j_x = i_x + \rho \cdot \cos(\theta) \\ j_y = i_y + \rho \cdot \sin(\theta) \end{cases}$$

wherein $\rho$ is any value of the interval $[0, R]$ denotes a spray radius. $\theta$ is any value of the interval $[0, 2\pi]$.

Preferably, the parameters related to the random spray retinex are tuned, wherein the parameters further include spray radius and radius density function.

Preferably, the spray radius related to the random spray retinex is tuned, including: selecting the diagonal length of the video images as a spray radius.

Preferably, the quantity of the spray pixel sets and the quantity of the pixels are tuned, including: selecting the quantity of the spray pixel sets as 1, and selecting the quantity of the pixels as 250.

Preferably, the video images processed by the random spray retinex are denoised via low pass filters and blur channels to get the brightness variation calculating formula, specifically including, calculating the brightness variations of the three channels to be served as the local brightness estimating vectors of RSR algorithm, according to the relative brightness variation calculating formula of pixels, based on RSR algorithm; and improving the local brightness estimating vectors of the RSR algorithm, with the low pass filters and the blur channels introduced successively, so as to obtain the brightness variation calculating formula after being denoised.

Preferably, the brightness variations of the three channels are calculated by the brightness calculating formula, specifically including: calculating the brightness variations of any specified pixels in each channel by the brightness calculating formula, and then calculating the brightness variations of the remaining pixels with nearest neighbor interpolation method to get the brightness variations of the three channels.

The technical solution of the invention provides a video image denoising and enhancing device based on random spray retinex, including: a tuning module, for structuring spray pixel sets and tuning the parameters related to the random spray retinex based on the spray pixel sets, wherein the parameters include the quantity of the spray pixel sets and the quantity of the pixels; a random spray retinex processing module, for processing the video images with random spray retinex based on the tuned parameters; a denoising module, for denoising the video images processed by the random spray retinex via low pass filters and blur channels to get the brightness variation calculating formula; a brightness variation calculating module, for obtaining the brightness calculating formula of the output images, combined with the brightness variation calculating formula, and calculating the brightness variations of the three channels via the brightness calculating formula to get the local brightness estimating vectors; a channel fusion module, for fusing the three channels based on the local brightness estimating vectors to get the denoised and enhanced video images.

Preferably, the denoising module includes: a RSR algorithm processing module, for calculating the brightness variations of the three channels to be served as the local brightness estimating vectors of RSR algorithm, according to the relative brightness variation calculating formula of pixels, based on RSR algorithm; and a RSR algorithm improving module, for improving the local brightness estimating vectors of the RSR algorithm, with the low pass filters and the blur channels introduced successively, so as to obtain the brightness variation calculating formula after being denoised.

Preferably, in the brightness variation calculating module, the brightness variations of the three channels are calculated by the brightness calculating formula, specifically including: calculating the brightness variations of any specified pixels in each channel by the brightness calculating formula, and then calculating the brightness variations of the remaining pixels with nearest neighbor interpolation method to get the brightness variations of the three channels.

The beneficial effects of the invention are:

1. The invention provides a brightness variation calculating formula to get effective denoising and thus much higher definition. Due to the same probability of the pixels from different angles, the halo problem in a traditional algorithm caused by a certain direction is solved.

2. The invention reduces the complexity of the algorithm, optimizes the quantity of the spray pixel sets and the pixels, specifically, N=1 and n=250, and further increases the running speed.

3. The mention calculates the brightness of the output images by calculating the brightness variation of any specified pixel i in each channel, and then calculating the brightness variations of the remaining pixels with nearest neighbor interpolation method, which further reduces the computation and greatly increases the enhancing speed, and thus more frame images are enhanced per unit time to meet the demand of real-time video enhancement.

4. The invention can be widely used in the fields of video enhancement, video analysis, target detection, tracking and preprocessing of recognition, etc.

The other characteristics and advantages of the invention are described in detail in the following embodiments.

BRIEF DESCRIPTION OF THE DRAWINGS

The accompanying drawings are intended to provide further understanding for the invention and constitute a part of description. The accompanying drawings are used to explain the invention, together with the following embodiments, but not intended to limit the invention. In the accompanying drawings.

DETAILED DESCRIPTION

The invention is further explained combined with the embodiments and the accompanying drawings. The following embodiments are only intended for illustrating and explaining the invention, without limiting the invention.

An embodiment of the invention provides a video image denoising and enhancing method based on random spray retinex, including the following steps: structuring spray pixel sets, and tuning the parameters related to the random spray retinex based on the spray pixel sets, wherein the parameters include the quantity of the spray pixel sets and the quantity of the pixels; processing the video images with random spray retinex based on the tuned parameters; denoising the video images processed by the random spray refines via low pass filters and blur channels to get the brightness variation calculating formula; obtaining the brightness calculating formula of the output images, combined with the brightness variation calculating formula, and calculating the brightness variations of the three channels by the brightness calculating formula, to get the local brightness estimating vectors; fusing the three channels based on the local brightness estimating vectors to get the denoised and enhanced video images.

Figure 1:
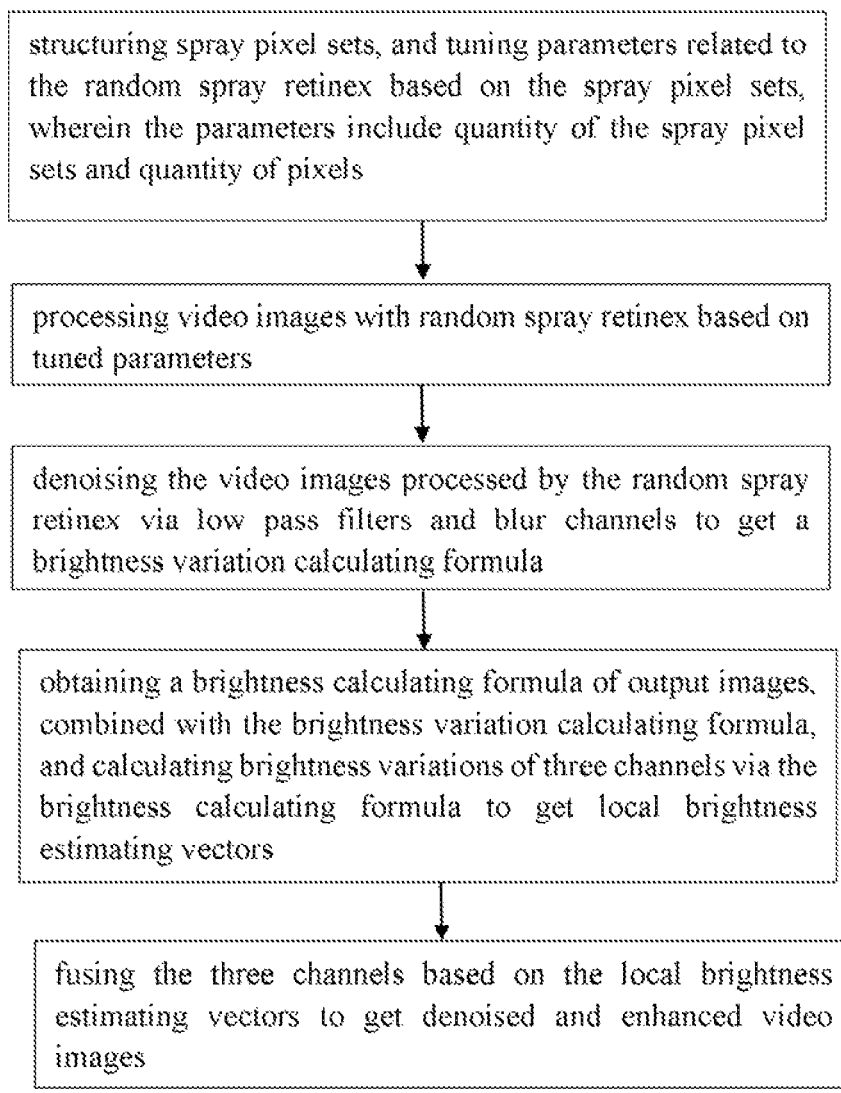
FIG. 1 is a flow chart of a video image denoising and enhancing method based on random spray retinex according to an embodiment of the invention.

Based on each basic step shown in FIG. 1, the specific implementation process is divided into the following sections.

1. Spray Pixel Sets are Structured, the Parameters are Tuned, and the Video Images are Processed with Random Spray Retinex Based on the Tuned Parameters.

Wherein, the spray pixel sets are structured by the polar coordinates, specifically including: the n pixels centering at the pixel i are represented by $Spray_k(i)$, wherein the coordinate of the pixel i is $(i_x, i_y)$ and the coordinate of the pixel j, belonging to the spray pixel set $Spray_k(i)$ is $(j_x, j_y)$, then the polar coordinate is:

$$\begin{cases} j_x = i_x + \rho \cdot \cos(\theta) \\ j_y = i_y + \rho \cdot \sin(\theta) \end{cases}$$

wherein $\rho$ is any value of the interval [0, R], R denotes a spray radius, $\theta$ is an value of interval $[0, 2\pi]$.

According to the above formula, the direction probabilities of the pixel locations from each angle are the same, and thus the probability is analyzed based on the radius. As to the area $C_r$ having a radius of r, the area is $A=\pi r^2$. The probability of the pixels within the scope of the radius r is r/R. Therefore, the quantity of the pixels is nr/R, according to the area formula, the quantity of the pixels is further $$\frac{n}{R}\sqrt{\frac{A}{\pi}},$$

and a derivation with respect to A is made to get:

$$\frac{d\left(\frac{n}{R}\sqrt{\frac{A}{\pi}}\right)}{dA} = \frac{n}{2R\sqrt{\pi A}}$$

It is substituted in $A=\pi r^2$, to get $$\delta(r) = \left(\frac{n}{2\pi R}\right)\frac{1}{r}.$$

It is appreciated from this formula that with the increasing radius, the quantity of the pixels within the area is decreasing Building up the function $f$ of the polar coordinate $\rho$, the formula of the polar coordinate is changed to:

$$\begin{cases} j_x = i_x + f(\rho) \cdot \cos(\theta) \\ j_y = i_y + f(\rho) \cdot \sin(\theta) \end{cases}$$

Wherein $\rho$ is within the interval $[0, R]$, and $\theta$ is any value of the interval of $[0, 2\pi]$. The log function and hyperbolic sine function have distributions similar to the density function distribution of $f(\rho)=\rho$. In an exponential function, when the exponent is greater than 1, the density of the central area increases with the increasing exponent, while when the exponent is smaller than 1, it deviates more from the original area. The linear function works to enlarge or narrow the proportion of radius to the area. According to the computation and the effect, $f(\rho)=\rho$ is adopted as the optimal radius density function to tune the radius density function.

Furthermore, the parameters related to the random spray retinex are tuned, wherein the parameters include the spray radius, the radius density function, the quantity of the spray pixel sets and the quantity of the pixels. The tuning of the radius density function is described as above, and the remaining three parameters are introduced as follows.

The spray radius R is defined as the analysis area around the pixel and the obtained pixels must show the color information of the regions around the pixel i. In this embodiment, the diagonal length of the video images is preferably R. If R is smaller than the diagonal length, then there are two extreme pixels which would never be compared and calculated; while if R is too large, most of the pixels generated randomly from the spray sets fail to occur within the image area.

The quantity N of the spray pixel sets and the quantity n of the pixels are two parameters closely related to each other. The value of N of the original random spray retinex algorithm is analyzed and improved. The final pixel brightness is the weighted average of N spray sets, and each spray set depends on the quantity of pixels for the maximum brightness. The amount of information obtained from the spray area is decided by the n if n is too large, the regional property cannot be demonstrated; while if n is too small, no enough information is obtained to reflect the color information of the regions around the pixel i.

Figure 2:
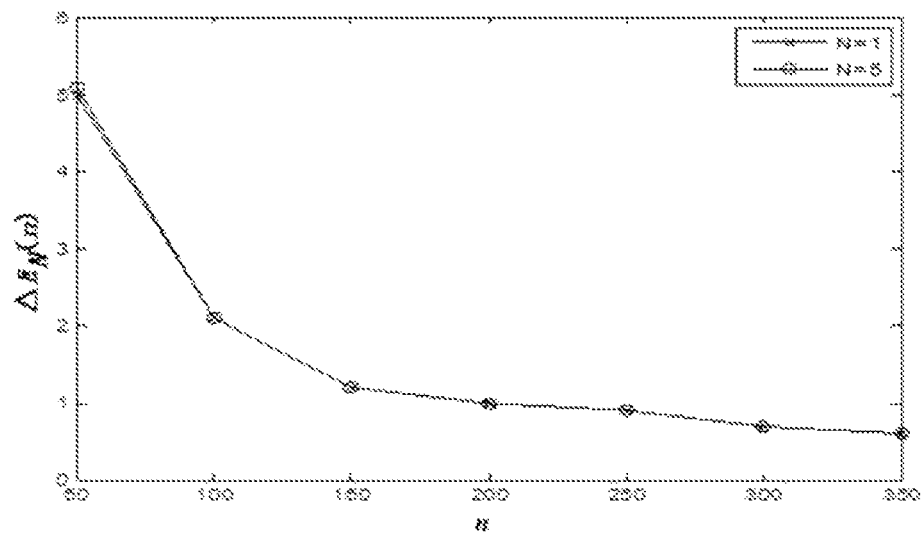
FIG. 2 (a) and FIG. 2 (b) are analysis diagrams of $\Delta E_N(n)$ and $\Delta E_n(N)$ corresponding to two values of N and different values of n.
Figure 2:
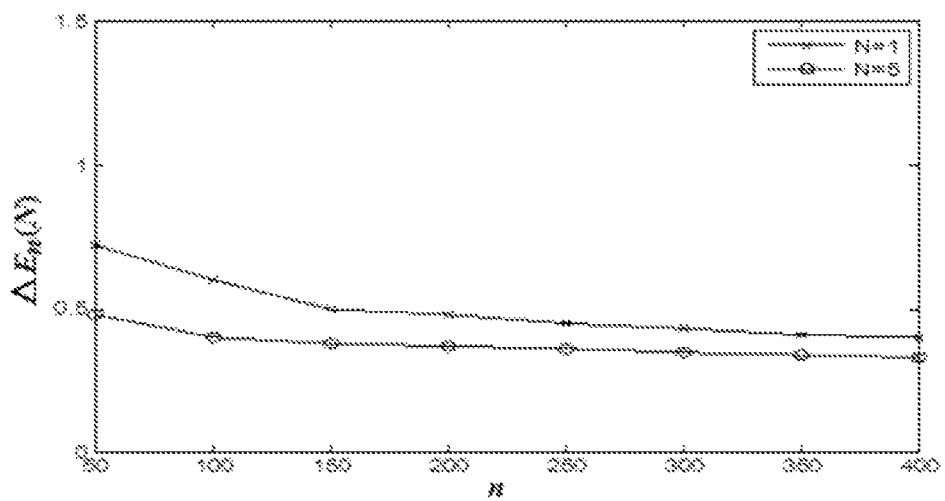

The optimal values of N and n are obtained by reducing the value of N·n. FIG. 2(a) and FIG. 2(b) are analysis diagrams of $\Delta E_N(n)$ and $\Delta E_n(N)$ corresponding to two values of N and different values of n. $\Delta E_N(n)$ and $\Delta E_n(N)$ are functions of CIELab perceptual differences. The value of N is selected as 1 and 5, and the value of n is selected as a continuous value having a step of 50 in the range of 50 to 400. Under the constraint conditions of $\Delta E_n(N)<1$ and $\Delta E_N(n)<1$, $1\times250=250<5\times250=1250$ can be obtained from FIG. 2, and thus N=1 and n=250 meet the above constraint conditions. Compared with N=20, n=400 proposed by random spray retinex in the prior art, the current values are more stable after being denoised, and the complexity of the algorithm is also reduced.

2. Denoising Processing

Figure 3:
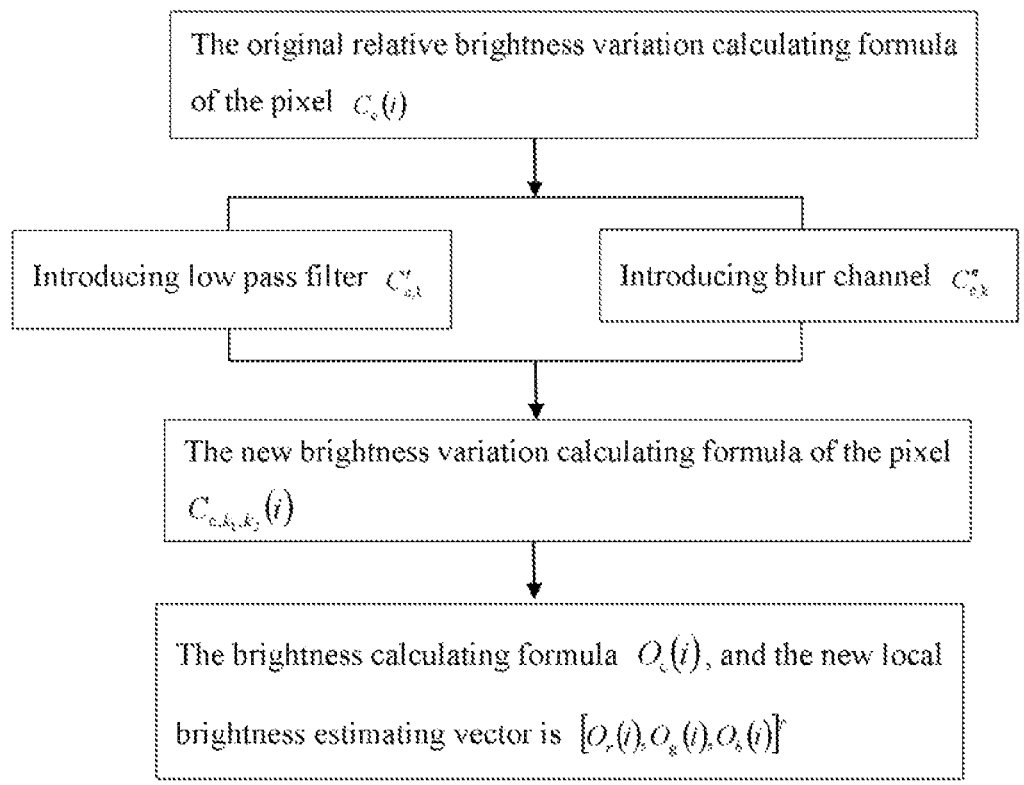
FIG. 3 is a flow chart of brightness calculation according to an embodiment of the invention.

FIG. 3 is the flow chart of the new brightness calculating formula origin, with the following specific steps: the relative brightness variation calculating formula of the pixel i is provides as:

$$C_c(i) = \frac{T_C(i)}{R_c(i)}$$

Wherein $C_c(i)$ is brightness variation of the pixel i in channel c, $I_c(i)$ is the brightness of the original image, $R_c(i)$ is the brightness of the processed image with RSR. The color images have three color channels, and the brightness variations of the three channels are calculated as the local brightness estimating vector or the RSR algorithm $[C_r(i), C_g(i), C_b(i)]^t$. Even though the denoising effect is unsatisfactory, the brightness difference between the spatial neighbor pixels is reduced, and thus the low pass filters are possible to be introduced without interfering with the brightness variation condition. Hence, the following formula is provided:

$$C_{c,k}(i)=(C_c*k)(i)$$

Wherein k is the average kernel, * denotes convolution operation.

Another denoising method is implemented by introducing blur channels.

$$C_{c,k}(i) = \frac{(I_c*k)(i)}{(R_c*k)(i)}$$

To achieve better denoising effects, the low pass filters and the blur channels are introduced to be combined together, to get the new brightness variation calculating formula:

$$C_{c,k_1,k_2}(i)=(C_{c,k_1}*k_2)(i)$$

3 Brightness Variation Calculation and Channel Fusion

Combined with the brightness variation calculating formula after being denoised, the brightness calculating formula of the output images is obtained as:

$$O_c(i) = \frac{I_c(i)}{C_{c,k_1,k_2}(i)}$$

Wherein $k_1$ and $k_2$ are average kernels. Upon experiments, the average kernels have a better image processing effect and execution efficiency than gaussian kernel. To simplify the parameter tuning, let $k_1=k_2$. The greater the average kernels, the better the denoising effect, and the locality of random spray retinex is also reduced. On the contrary, the smaller the average kernels, the worse the denoising effect. A good balance is to choose a smaller kernel for the images which need no important quality enhancement. The preferable option is 25×25, which can obtain the same enhancing, quality, as well as eliminating some visual anomalies from the perspective of the human eyes.

To improve the real time performance of the video images, it is unnecessary to calculate the brightness variation of each pixel, instead, only the pixel on line r, column c is selectively processed (i.e., any specified pixel) and the remaining pixels are calculated with the nearest neighbor interpolation method, preferably r=c=1.

At last, the brightness variations of the three channels are calculated as the new local brightness estimating vector $[O_r(i), O_g(i), O_b(i)]^t$, and then the three channels are fused to get the final denoised and enhanced output video images.

Figure 4:
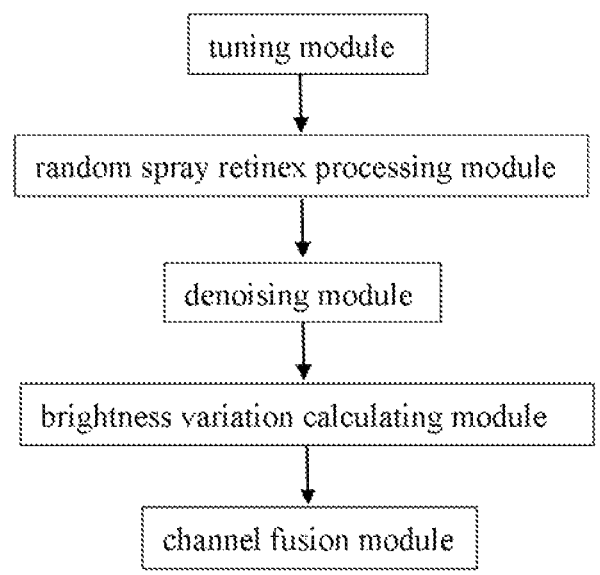
FIG. 4 is a structural schematic view of a video image denoising and enhancing device based on random spray retinex according to an embodiment of the invention.

Correspondingly, an embodiment of the invention also provides a video image denoising and enhancing device based on random spray retinex, as shown in FIG. 4, including a tuning module, for structuring spray pixel sets and tuning the parameters related to the random spray retinex based on the spray pixel sets, wherein the parameters include the quantity of the spray pixel sets and the quantity of the pixels; a random spray retinex processing module, for processing the oldest images with random spray retinex based on the tuned parameters; a denoising module, for denoising the video images processed by the random spray retinex via low pass filters and blur channels to get the brightness variation calculating formula; a brightness variation calculating module, for obtaining the brightness calculating formula of the output images, combined with the brightness variation calculating formula, and calculating the brightness variations of the three channels via the brightness calculating formula to get the local brightness estimating vectors; a channel fusion module, for fusing the three channels based on the local brightness estimating vectors to get the denoised and enhanced video images.

Wherein, the denoising module includes: a RSR algorithm processing module, for calculating the brightness variations of the three channels to be served as the local brightness estimating vectors of RSR algorithm, according to the relative brightness variation calculating formula of pixels, based on RSR algorithm; and a RSR algorithm improving module, for improving the local brightness estimating vectors of the RSR algorithm, with the low pass filters and the blur channels introduced successively, so as to obtain the brightness variation calculating formula after being denoised.

The specific implementation process of the device corresponds with the above-mentioned video image denoising and enhancing method based on random spray retinex, and thus would not be described here.

The preferred embodiments are described combined with the accompanying drawings as above, however, the invention is not limited to the details of the above embodiments. Within the scope of the technical conception of the invention, simple variations can be made to the technical solutions of the invention and all fall into the scope of the invention.

It should be additionally noted that all the specific technical characteristics described in the above-mentioned embodiments can be combined in any suitable manner provided that there is no contradiction. The various possible combinations would not be described here to avoid unnecessary repetitions.

In addition, the various embodiments of the invention can also be arbitrarily combined, which is deemed as the disclosure of the invention, as long as without departing from the ideas of the invention.

The invention claimed is:

1. A video image denoising and enhancing method based on random spray retinex, comprising:
   structuring spray pixel sets, and tuning parameters related to the random spray retinex based on the spray pixel sets, wherein the parameters include quantity of the spray pixel sets and quantity of pixels;
   processing video images using the random spray retinex based on tuned parameters;
   denoising the video images processed by the random spray retinex via low pass filters and blur channels to get a brightness variation calculating formula;
   obtaining a brightness calculating formula of output images, combined with the brightness variation calculating formula, and calculating brightness variations of three channels via the brightness calculating formula to get local brightness estimating vectors; and
   fusing the three channels based on the local brightness estimating vectors to get denoised and enhanced video images;
   wherein, the spray pixel sets are structured by polar coordinates, including
   n pixels centering at pixel i are represented by $Spray_k(i)$, wherein a coordinate of the pixel i is $(i_x, i_y)$, and a coordinate of the pixel j, belonging to the spray pixel sets $Spray_k(i)$ is $(j_x, j_y)$, then the polar coordinates are $$\begin{cases} j_x = i_x + \rho \cdot \cos(\theta) \\ j_y = i_y + \rho \cdot \sin(\theta) \end{cases}$$

wherein $\rho$ is any value of an interval $[0, R]$, R denotes a spray radius, $\theta$ is any value of an interval $[0, 2\pi]$.

2. The video image denoising and enhancing method of claim 1, wherein, the parameters related to the random spray retinex are tuned, wherein the parameters further include a spray radius and a radius density function.

3. The video image denoising and enhancing method of claim 2, wherein, the spray radius related to the random spray retinex is tuned, including: selecting a diagonal length of the video images as the spray radius.

4. The video image denoising and enhancing method of claim 1, wherein, the quantity of the spray pixel sets and the quantity of the pixels are tuned, including: the quantity of the spray pixel sets is selected as 1, and the quantity of the pixels is selected as 250.

5. The video image denoising and enhancing method of claim 1, wherein, the video images processed by the random spray retinex are denoised via the low pass filters and the blur channels to get the brightness variation calculating formula, including:
   calculating the brightness variations of the three channels to be served as the local brightness estimating vectors of RSR algorithm, according to relative brightness variation calculating formula of the pixels, based on the RSR algorithm; and
   improving the local brightness estimating vectors of the RSR algorithm, with the low pass filters and the blur channels introduced successively, so as to obtain the brightness variation calculating formula after being denoised.

6. The video image denoising and enhancing method of claim 1, wherein, the brightness variations of the three channels are calculated via the brightness calculating formula, including:
   calculating a brightness variation of any specified pixel in each channel via the brightness calculating formula, and then
   calculating brightness variations of remaining pixels with nearest neighbor interpolation method to get the brightness variations of the three channels.

* * * * *